United States Patent
Jang

Patent Number: 6,072,668
Date of Patent: Jun. 6, 2000

[54] FULL WIDTH ERASE HEAD ASSEMBLY FOR MAGNETIC REPRODUCER

[75] Inventor: Myoung-sub Jang, Kyonggi-do, Rep. of Korea

[73] Assignee: Samsung Electronics Co., Ltd., Kyungki-do, Rep. of Korea

[21] Appl. No.: 09/122,795

[22] Filed: Jul. 27, 1998

[30] Foreign Application Priority Data

Jul. 25, 1997 [KR] Rep. of Korea ............... 97-34862

[51] Int. Cl.[7] ............................................. G11B 5/127
[52] U.S. Cl. ............................................. 360/118
[58] Field of Search ........................ 360/118, 103–106, 360/85, 132, 133

[56] References Cited

U.S. PATENT DOCUMENTS 5,444,588  8/1995  Choi ........................................ 360/104
5,880,909  3/1999  Jeong et al. ............................ 360/104

Primary Examiner—Allen T. Cao
Attorney, Agent, or Firm—Sughrue, Mion, Zinn, Macpeak & Seas, PLLC

[57] ABSTRACT

Disclosed is a full width erase head assembly for a magnetic reproducer. According to the present invention, a horizontal flow preventing member is extended to a predetermined angle from a rear side portion of the body which is installed on the main base. A vertical flow preventing member which is parallel to the horizontal flow preventing member and faces mutually opposite direction around the body of the FE head are installed at a lower portion of the body of the FE head compared to the height of the horizontal flow preventing member.

9 Claims, 3 Drawing Sheets

FULL WIDTH ERASE HEAD ASSEMBLY FOR MAGNETIC REPRODUCER

BACKGROUND OF THE INVENTION

1. Field of the Invention.

The present invention relates to a full width erase head assembly(hereinafter it will be referred as a FE head assembly) for a magnetic reproducer, and more particularly, relates to a FE head assembly for a magnetic reproducer which is combined with and fixed to a main base and easily assembled by improving its formation.

2. Background of the Related Art

Generally, traveling paths of a tape which is received in a magnetic reproducer such as a video cassette recorder and produces image and voice is hereinafter. A tape withdrawn from a supply reel of a video cassette contacts a FE head through a tension arm. In the recording process the FE head proceeds erase work by applying high frequency current. Then, the tape can record or reproduce a video signal by a rotational head cylinder and reaches a voice/control head through a voice erase head.

A voice head is at an upper portion of the voice/control head and a control head is at a lower portion of the voice/control head, respectively, and the voice/control head records and reproduces a voice and a control signals at each track. Generally, the voice erase head is not used because of the FE head, but an audio erase head is solely used in audio dubbing. Then, for safely traveling a tape, the tape is wounded at a take up reel of the video cassette through a capstan.

In recording, a tape is received and moved in the video cassette recorder like an aforementioned manner and the recording is executed b y the FE head which proceeds the erase work by applying high frequency current. As shown in FIG. 1, the FE head is fixed to a main base 10 of the video cassette recorder by using a screw 30.

In assembling the FE head 20 on the rain base 10, a terminal 40 formed at the bottom portion of the FE head 20 is inserted and fixed to a printed circuit board(not shown) and supplies a predetermined signal to the FE head 20.

In the mean time, the combining and fixing process of the FE head 20 to the main base 10 will be described in detail hereinafter. When the FE head 20 is inserted in the main base 10, a fixing through hole 25 formed at one side portion of the FE head 20 is agreed with a combining hole 15 formed at the main base 10 with corresponding to the fixing through hole 25 and the FE head 20 is tightly fixed to the main base 10 by using the screw 30. Then, the terminal 40 is inserted in and fixed to the printed circuit board through next works.

In a related art, because the FE head 20 which is combined with and fixed to the main base 10 like an aforementioned manner is assembled and fixed to the main base 10 by using the screw 30. So, there are problems that the operation processes are increased and a number of parts are needed and consequently, the production cost is increased.

SUMMARY OF THE INVENTION

Therefore, it is an object of the present invention to easily assembly a FE head by improving the formation of the FE head which is assembled and fixed to a main base.

According to the present invention, a horizontal flow preventing member is extended to a predetermined angle from a rear side portion of the body which is installed on the main base. For facing toward mutually opposite direction around the body, a vertical flow preventing member which is apart from a downward direction of the horizontal flow preventing member to a predetermined distance toward a height direction of the body is extended from a side portion of the body.

Preferably, the distance between the horizontal flow preventing member and the vertical flow preventing member is a little shorter than the thickness of the main base.

Moreover, the angle between the horizontal flow preventing member and the body is approximately 23° in one preferable embodiment.

Preferably, the horizontal flow preventing member has elasticity and is equipped with a protrusion at a center line of the lower surface of the end portion and a perforating hole which is corresponding to the protrusion and receives the protrusion is formed at the main base.

In one preferable embodiment, the vertical flow preventing member includes a pair of the first vertical flow preventing members which are extended to a mutually opposite direction around the body and a pair of the second vertical flow preventing members which are formed apart from the first vertical flow preventing members to a predetermined distance.

Preferably, the first vertical flow preventing member has big elasticity because it is thin, wide and long and the second vertical flow preventing member has small elasticity because it is thick, narrow and short.

Moreover, the end portions of the first and the second vertical flow preventing members are respectively folded toward an upper portion and have protrusion portions having the same height.

Moreover, a perforating hole which is corresponding to the body and a pair of the first and the second guide holes which are formed as a single hole with the perforating hole and corresponding to the first and the second vertical flow preventing members are respectively formed on the main base.

BRIEF DESCRIPTION OF THE DRAWINGS

A more complete appreciation of the present invention, and may of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
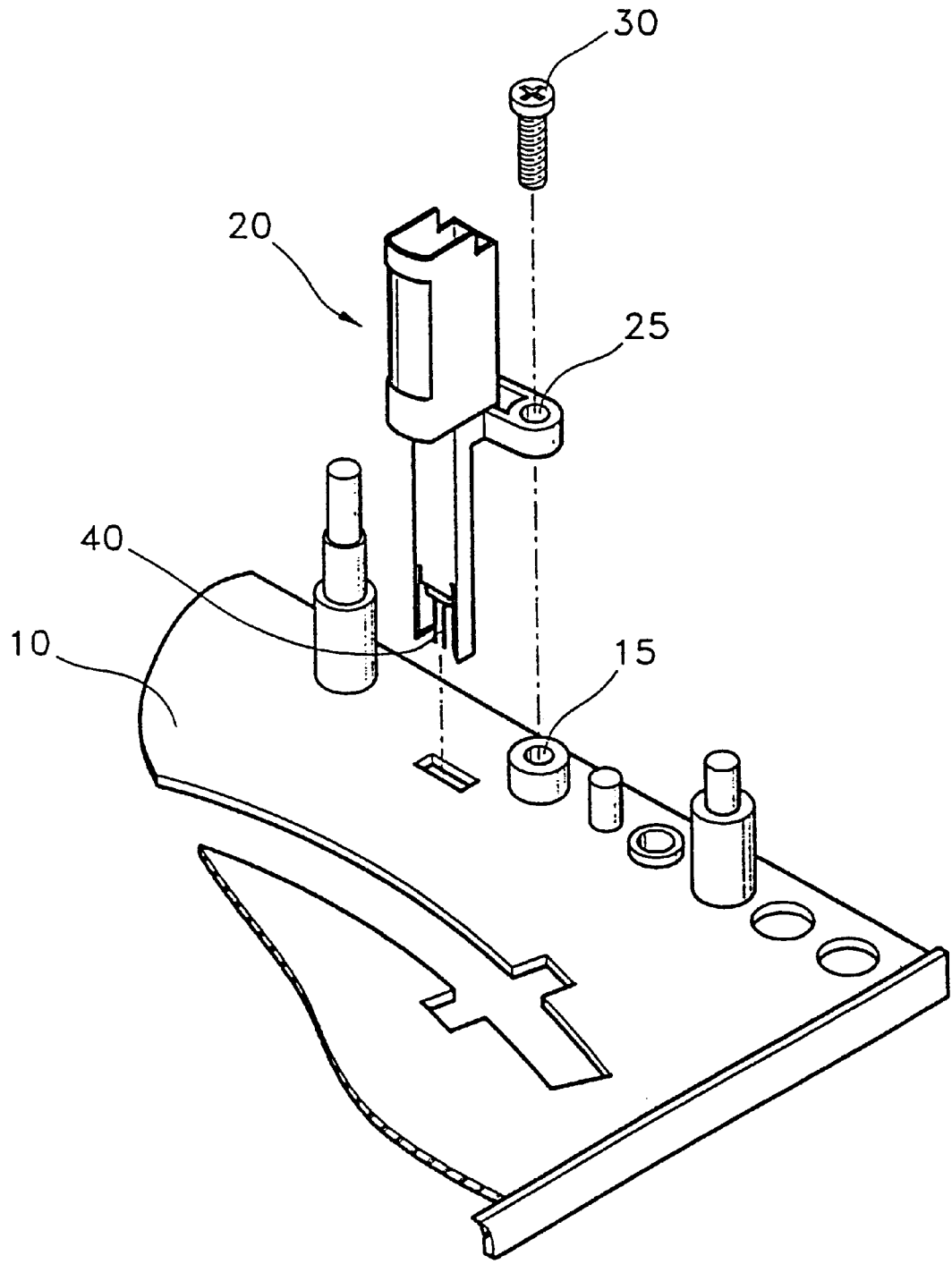
FIG. 1 is an exploded perspective view illustrating a FE head which is fixed to a main base of a conventional video.
Figure 2:
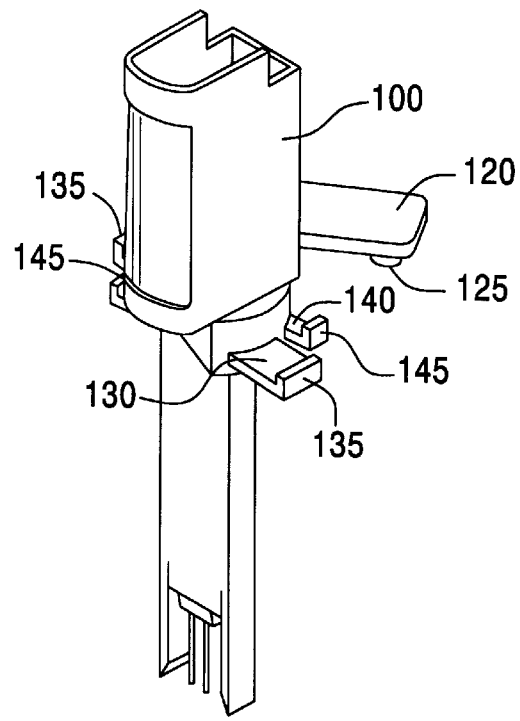
FIG. 2 is a perspective view of a FE head of the present invention.

The objects, characteristics and advantages of the above-described invention will be more clearly understood through the preferable embodiments referring to the attached drawings.

The FE head assembly for a magnetic reproducer according to the present invention with referring to FIGS. 2 through 5 will be described hereinafter. A horizontal flow preventing member 120 for preventing horizontal flow of a body 100 of a FE head is extended to a predetermined angle from a rear side portion of the body 100 of the FE head. Vertical flow preventing members 130 and 140 which are parallel to the horizontal flow preventing member 120 and are mutually extended toward opposite direction around the body 100 of the FE head are installed at a lower portion of the body 100 of the FE head compared to the horizontal flow preventing member 120.

Preferably, the distance between the horizontal flow preventing member 120 and the vertical flow preventing members 130 and 140 are a little shorter than the thickness of the main base 110.

Moreover, preferably, the horizontal flow preventing member 120 has elasticity by forming the horizontal flow preventing member 120 and the body 100 of the FE head as a single body and, preferably, the rear side portion of an angle between the horizontal flow preventing member 120 and the body 100 is approximately 23°. A protrusion 125 is protruding at the center line of the lower surface of an end portion of the horizontal flow preventing member 120.

Moreover, the vertical flow preventing member includes a pair of a first vertical flow preventing members 130 which are mutually extended toward opposite direction around the body 100 of the FE head and a pair of a second vertical flow preventing members 140 which are formed apart from the first vertical flow preventing member 130 to a predetermined angle.

The first vertical flow preventing member 130 has big elasticity because it is thin, wide and long and the second vertical flow preventing member 140 has small elasticity because it is thick, narrow and short. The end portions of the first and the second vertical flow preventing members 130 and 140 are respectively folded toward an upper direction and have protrusion portions 135 and 145 having the same height.

Figure 3:
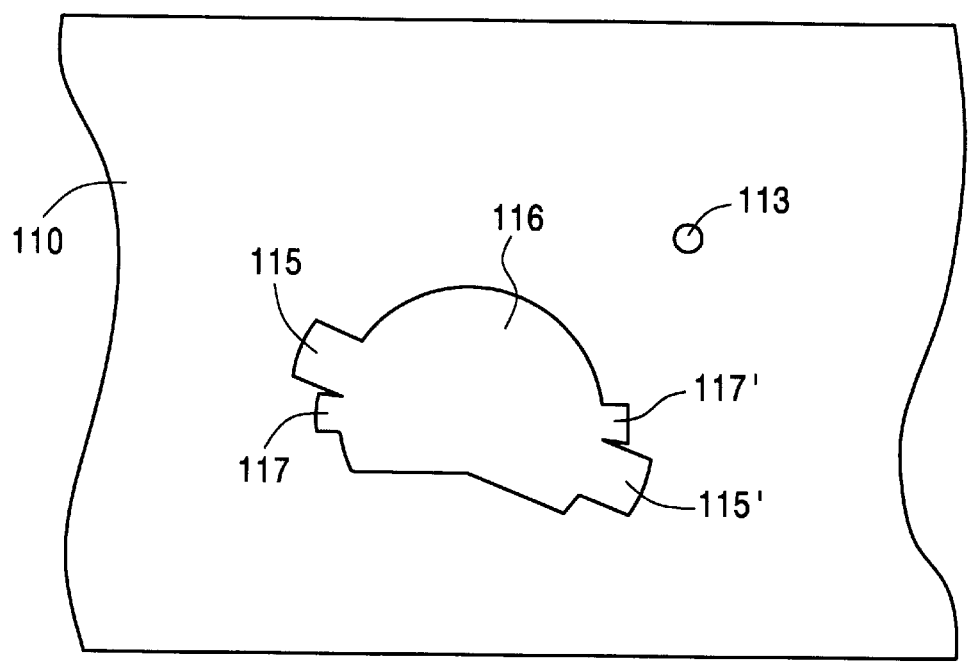
FIG. 3 is a plan view of a main base according to the present invention.

In the mean time, as shown in FIG. 3, a perforating hole 113 which is corresponding to the protrusion 125 of the horizontal flow preventing member 120 is formed on the main base 110. A perforating hole 116 which is corresponding to the body 100 of the FE head and a pair of a first and a second guide holes 115, 115', 117 and 117' which are connected with the perforating hole 116 and corresponding to a pair of the first and the second vertical flow preventing members 130 and 140 are respectively formed on the main base 110.

The installing method of the FE head on the main base 110 according to the preferable embodiment formed like as an aforementioned manner will be described in detail hereinafter.

First, when the FE head is located in such a manner that the perforating hole 116 and the first and the second guide holes 115 and 117 are corresponding to the body 100 and the first and the second vertical flow preventing members 130 and 140, respectively, the FE head is inserted to the main base 110.

Then, the horizontal flow preventing member 120 is touched to the main base 110 and not inserted anymore. As aforementioned, the distance between the horizontal flow preventing member 120 and the vertical flow preventing members 130 and 140 is a little shorter than the thickness of the main base 110, so the vertical flow preventing members 130 and 140 can not be rotated.

But, when the FE head is pushed, the horizontal flow preventing member 120 having elasticity is bent and the distance between the horizontal flow preventing member 120 and the vertical flow preventing members 130 and 140 becomes longer than the thickness of the main base 110. Subsequently, the vertical flow preventing members 130 and 140 can be rotated.

Figure 4:
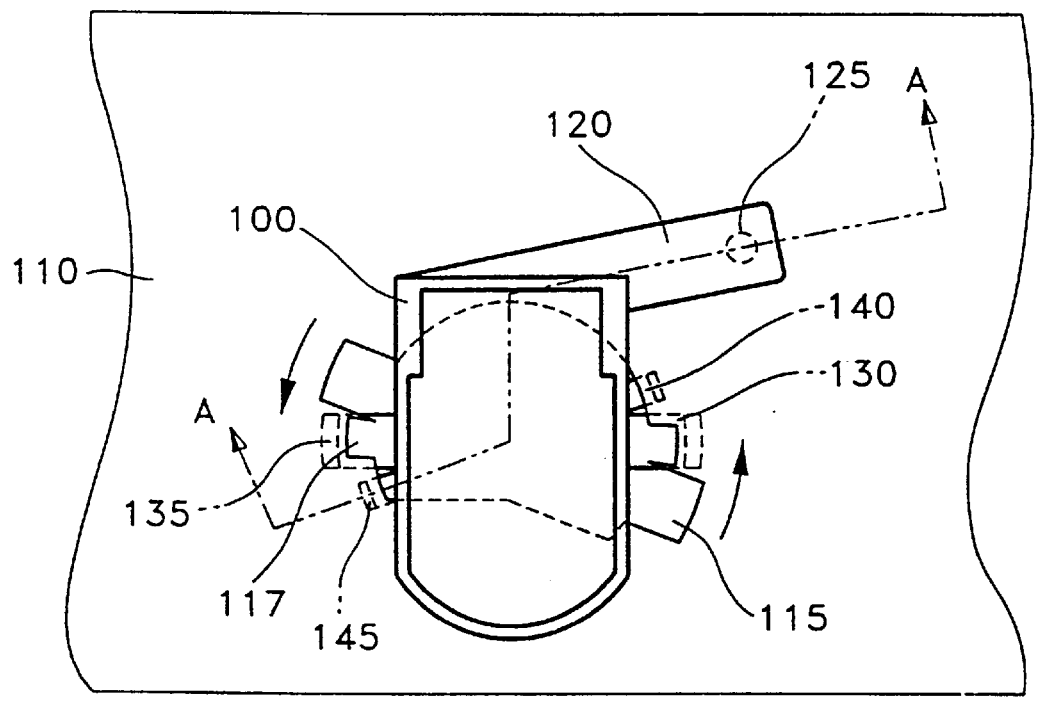
FIG. 4 is a plan view illustrating a state when the FE head is fixed to the main base according to the present invention.
Figure 5:
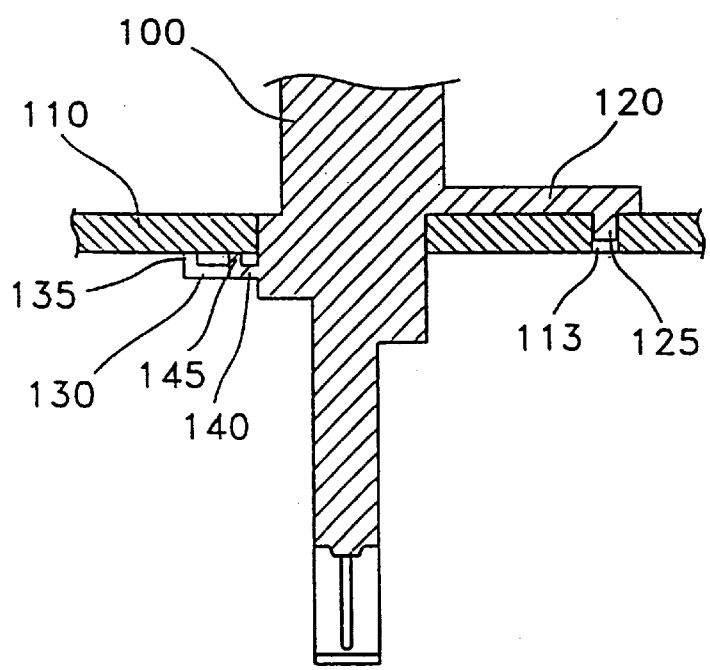
FIG. 5 is a sectional side view illustrating a state when the FE head is fixed to the main base according to the present invention.

Accordingly, when the body 100 is horizontally rotated to one direction such as a counterclockwise direction as shown in FIG. 4 by using a drawn arrow, the first and the second vertical flow preventing members 130 and 140 are respectively shifted from the first and the second guide holes 115 and 117 and then, the first and the second vertical flow preventing members 130 and 140 press the bottom surface of the main base 110. Moreover, the horizontal flow preventing member 120 rotates according to the rotation of the body 100 and when the protrusion 125 is located at the corresponding position of the perforating hole 113 of the main base 110, the protrusion 125 is inserted to the perforating hole 113 and the rotation of the body 100 is stopped.

Then, when the body 100 rotates, the surface of the main base 110 is not injured because the vertical flow preventing member 120 has elasticity itself.

Like this, under the condition that the protrusion 125 of the horizontal flow preventing member 120 is inserted to the perforating hole 113, the protrusion portions 135 and 145 of the vertical flow preventing members 130 and 140 are direct contacted to the bottom surface of the main base 110 and press the main base 110, accordingly, the body 100 is safely fixed to the main base 110.

Moreover, the supporting power of the first vertical flow preventing member 130 against the body 100 is evenly dispersed because the first vertical flow preventing member 130 has big elasticity by forming it thin, wide and long. Moreover, the second vertical flow preventing member 140 has sufficient strength against outer impact because the second vertical flow preventing member 140 has small elasticity by forming it thick, narrow and short.

In the mean time, when the body 100 is disassembled form the main base 110, the disassembling process is reversely executed compared to an aforementioned assembling manner. In other words, the protrusion 125 is withdrawn from the perforating hole 113 by lifting the horizontal flow preventing member 120 having elasticity to an upright direction and is rotated to a clockwise direction which is the opposite direction compared to the aforementioned rotational direction. Then, when the body 100 and the first and the second vertical flow preventing member 130 and 140 are located to the corresponding position of the perforating hole 116 of the main base 110 and the first and the second guide holes 115 and 117, the body 100 is disassembled from the main base 110 by upwardly withdrawing the FE head.

As aforementioned, in the FE head assembly for a magnetic reproducer according to the present invention, the FE head assembly is installed on the main base 110 without using a screw, so, the fabricating process is simplified and the production cost is reduced according to the reduction of the required parts.

Moreover, the time for installing the FE head is shortened by finishing installation of the FE head with slightly pressing and rotating when the FE head is inserted to the main base 110.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A full width erase head assembly for a magnetic reproducer, comprising:
    a body installed at a main base, having a pair of terminals protrudingly and downwardly formed on a lower portion thereof;
    a horizontal flow preventing member extending from a rear side portion of said body at a predetermined angle and preventing horizontal flow of said body;
    a vertical flow preventing member extending from a side portion of the body in a mutually opposite direction around the body and being apart from the horizontal flow preventing member to a predetermined distance;
    said horizontal flow preventing member having elasticity, and being equipped with a protrusion at a center line of a lower surface of an end portion of said horizontal flow preventing member.

2. The full width erase head assembly for a magnetic reproducer of claim 1, the distance between said horizontal flow preventing member and said vertical flow preventing member is a little shorter than the thickness of said main base.

3. The full width erase head assembly for a magnetic reproducer of claim 1, the angle between said horizontal flow preventing member and the rear side portion of said body is approximately 23°.

4. The full width erase assembly for a magnetic reproducer of claim 1, a perforating hole for inserting said protrusion is formed on said main base which is corresponding to said protrusion of said horizontal flow preventing member.

5. The full width erase head assembly for a magnetic reproducer of claim 1, wherein said vertical flow preventing member comprises;
    a pair of first vertical flow preventing members extended to a mutually opposite direction around said body; and
    a pair of second vertical flow preventing members formed apart from said first vertical flow preventing member to a predetermined angle.

6. The full width erase head assembly for a magnetic reproducer of claim 5, wherein said first vertical flow preventing member has big elasticity by forming it thin, wide and long and said second flow preventing member has small elasticity by forming it thick, narrow and short.

7. The full width erase head assembly for a magnetic reproducer of claim 6, wherein the end portions of said first and said second vertical flow preventing members are respectively folded toward an upper direction and formed protrusion portions, respectively.

8. The full width erase head assembly for a magnetic reproducer of claim 7, wherein each height of said protrusion portion is the same.

9. The full width erase head assembly for a magnetic reproducer of claim 5, wherein a perforating hole which is corresponding to said body of the FE head and a pair of a first and a second guide holes which are connected with said perforating hole and correspond to a pair of said first and said second vertical flow preventing members are respectively formed on the main base.

* * * * *